Dec. 3, 1968  M. J. FISHER ET AL  3,414,742
ELECTROSTATIC ENERGY CONVERTER
Filed Oct. 12, 1966
2 Sheets-Sheet 1
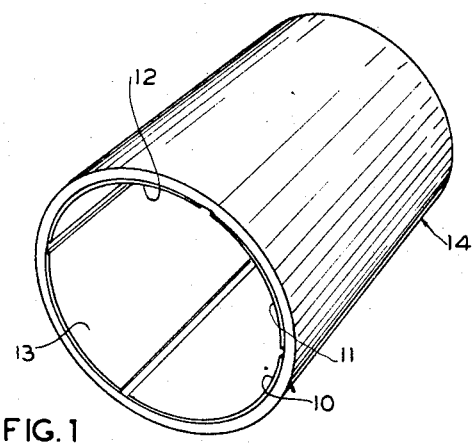
FIG. 1
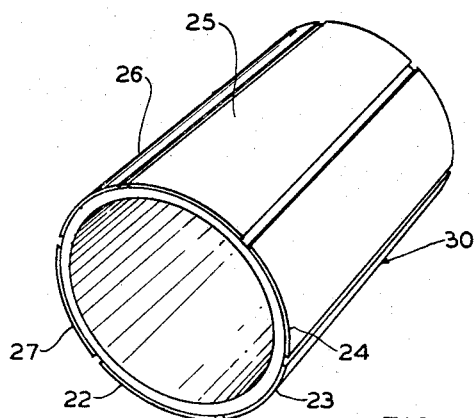
FIG. 2
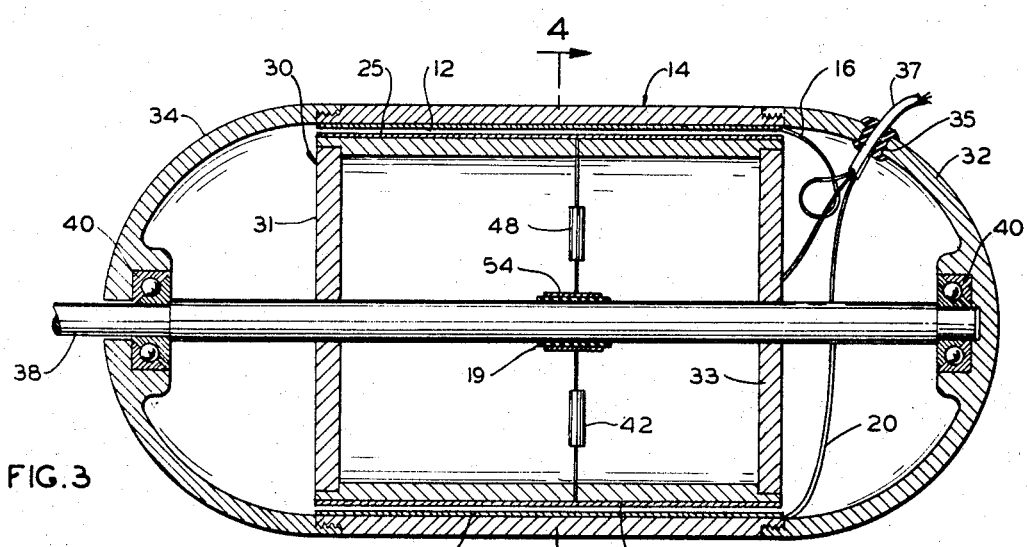
FIG. 3
FIG. 4
FIG. 5
INVENTORS
MARVIN J. FISHER
WAYNE R. HUELSKOETTER
DAVID D. LYNCH, JR.

Dec. 3, 1968  M. J. FISHER ETAL  3,414,742

ELECTROSTATIC ENERGY CONVERTER

Filed Oct. 12, 1966  2 Sheets-Sheet 2

INVENTORS
MARVIN J. FISHER
WAYNE R. HUELSKOETTER
DAVID D. LYNCH, JR.

United States Patent Office 3,414,742
Patented Dec. 3, 1968

3,414,742
ELECTROSTATIC ENERGY CONVERTER
Marvin J. Fisher, 320 Country Club Drive, Ballwin, Mo. 63011; Wayne R. Huelskoetter, 3013 McLeod, Burnsville, Minn. 55378; and David D. Lynch, Jr., 1230 Carol Ann, Kirkwood, Mo. 63122
Continuation-in-part of application Ser. No. 269,380, Apr. 1, 1963. This application Oct. 12, 1966, Ser. No. 586,299
14 Claims. (Cl. 310—5)

This is a continuation-in-part of application Ser. No. 269,380, filed Apr. 1, 1963, now abandoned.

This invention relates to electromechanical energy conversion means of an electrostatic type and, more particularly, to an electrostatic energy converter adapted to operate at many and various non-synchronous speeds.

Electrostatic machines have many advantages over electromagnetic machines of the same horsepower rating which include the capability of being made much lighter in weight since they do not require iron for a magnetic circuit as do the electromagnetic machines. Thus, a significant weight advantage may be attained by the electrostatic machine. These machines also have, in general, higher efficiencies on a rated horsepower basis than the electromagnetic machines.

Previous electrostatic machines have been generally one of the following three types:

(1) Alternating curent machines which are capable of producing average torque at only one fixed value of speed. This fixed speed is determined by the geometry and the alternating current frequency.

(2) Machines utilizing a unidirectional supply, with commutating means to provide internal alternating currents.

(3) Charge transport machines which operate in a unidirectional electrical circuit. Such machines need not operate at a fixed value of speed.

In contrast to the above types, the electrostatic energy converter of the present invention converts electrical energy into mechanical energy or vice versa, as desired, when operated at predetermined non-synchronous speeds in conjunction with an external alternating current electrical circuit.

It is an object, therefore, of the present invention to provide an electrostatic energy converter capable of operation as either a motor or a generator depending upon its speed, that is, for speeds between zero and synchronous speed it can operate as an electrostatic motor converting electrical energy to mechanical energy whereas for speeds above synchronous speed it can operate as an electrostatic generator converting mechanical energy to electrical energy.

It is another object of the present invention to provide an electrostatic motor or generator which need not have an electrical connection, such as commutating devices, between the rotor structure and an external electrical circuit.

It is another object of the present invention to provide an electrostatic energy converter capable of providing a torque at any value of speed, other than synchronous speed, including zero and negative speeds.

Further objects and advantages of the present invention will appear from the following detailed description of the several embodiments of the invention.

The present invention, in general, pertains to an electrostatic energy converting device useful as a motor or generator which is provided with a rotor member and a stator member, each of which containing a plurality of conducting surfaces, with the conducting surfaces of one of the members adapted to be energized by a polyphase alternating current source in order to induce electrical charges on the conducting surfaces of the other member, and means, electrically cooperating with each of the conducting surfaces of the other member, for controlling the movement of the induced electrical charges and establishing a resultant net torque between the rotor member and the stator member to produce energy conversion, all of which will be more fully discussed hereinafter.

In order to facilitate the description and understanding of this invention, reference is made to the appended drawings in which:

FIGURE 1 is a perspective view of a stator of one embodiment of the present invention with end bells removed;

FIGURE 2 is a perspective view of a rotor drum of the embodiment of FIGURE 1;

FIGURE 3 is a longitudinal cross-sectional view of the rotor and stator of FIGURES 1 and 2, respectively, assembled with end bells;

FIGURE 4 is a sectional side view of the apparatus viewed through the plane containing line 4—4 of FIGURE 3.

FIGURE 5 is a schematic diagram of the embodiment of FIGURES 1-4;

Figure 6:
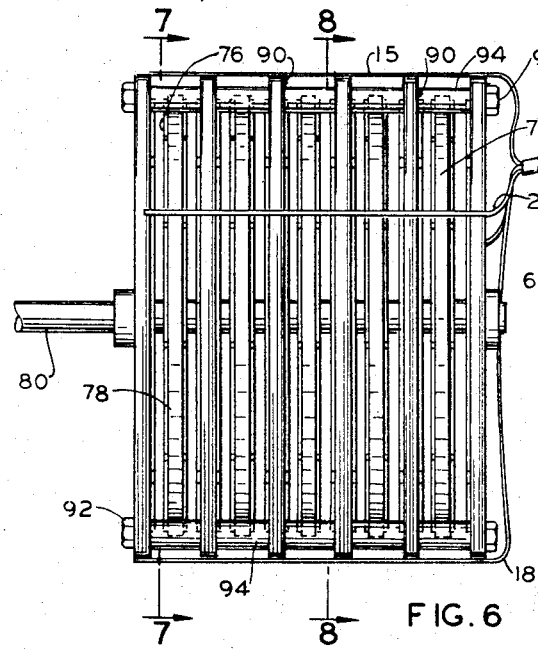
FIGURE 6 is a longitudinal assembled view of another embodiment of the present invention.

Referring now to the drawings and particularly to FIGURES 1-5.

In FIGURE 1 numerals 10, 11, 12 and 13 indicate thin conducting strips such as copper and the like (stator plates) secured by any suitable means to the inner surface of a hollow cylindrical stator structure 14 comprised of an insulating material. These four strips can be placed, as shown, parallel to the axis of the cylinder and radially spaced therefrom an equal distance. Although the number of stator plates can vary widely there should be at least two such plates and preferably a plurality of such plates since it appears, generally speaking, the more plates used the better will be the operation of the converter. Additionally, the number of stator plates should be equal to an integral number times the number of phases of alternating electrical current being supplied to the conducting surfaces. For example, if a three-phase alternating electrical current is being supplied there should be either 3, 6, 9, 12, etc., stator plates. In the case of four-phase motor operation, alternating current sources of suitable frequency, as for instance 60 cycles per second, are connected to the respective stator plates as shown schematically in FIGURE 5. Supply lines 16, 15, 20 and 18 are connected to stator plates 12, 11, 10 and 13, respectively, and are assumed to be in sequential electrical phase relationship. If it is desired to reverse rotation of the device the supply lines should be connected in reverse order.

The rotor structure as shown in FIGURE 2 may be formed by securing conducting strips 22, 23, 24, 25, 26 and 27 such as copper and the like (rotor plates) upon the outer surface of cylindrical rotor structure 30 of a drum type and comprised of insulating material. These strips can be placed, as shown, parallel to the axis of the cylinder and radially spaced therefrom an equal distance. Although the number of rotor plates can vary widely there should be at least two such plates and preferably a plurality of such plates since it appears, generally speaking, the more plates used the better will be the operation of the converter.

In FIGURE 3, the assembled rotor 30 and stator 14 are shown. Suitable end bells, 32 and 34, are secured to the stator 14 around the circumference of its top and base cylindrical structure by screws or other suitable means. For purposes of illustration, stator plates, 10 and 12, are shown secured to the inner surface of stator 14. In addition a line 37 (carrying supply lines 16 and 20) is passed through a suitable aperture 35 and supply lines 20 and 16 electrically connected to stator plates, 10 and 12, respectively. The rotor 30 is provided with circular top and base plates, 31 and 33, which are secured to the inner surface of the cylindrical rotor structure by screws or other suitable means. Again for purposes of illustration, rotor plates, 22 and 25, are shown secured to the outer surface of rotor 30. Additionally, charge controlling means, 42 and 48, are electrically connected to rotor plates, 22 and 25, respectively. The charge controlling means are further electrically connected to each other by a connecting ring 54 which is electrically insulated from shaft 38 by an insulating sleeve 19. The top and base plates, 31 and 33, are secured to rotor shaft 38, which is supported by bearings 40 located within end bells, 32 and 34, with the rotor shaft projecting through bearing 40 provided in end ball 34. The rotor shaft is rotatable within bearings 40 and functions to rotate with the rotor about the axis of rotation of the rotor. The stator plates are oppositely disposed to the rotor plates with a relatively small space provided therebetween in order to prevent the stator plates from making physical contact with the rotor plates. The gap or space between the stator plates and rotor plates can vary, inter alia, the type of medium within the space but should not be so great that induced charges cannot be generated on the rotor plates as will be more fully described hereinafter. Thus, the stator plates as well as the rotor plates are parallel to the axis of rotation of the rotor.

FIGURE 4 further shows the assembled rotor 30 stator 14. Rotor 30 has circumferentially secured thereto rotor plates 22, 23, 24, 25, 26 and 27 as previously described. Each rotor plate has a charge controlling means electrically connected thereto (resistors 42, 44, 46, 48, 50 and 52 to rotor plates 22, 23, 24, 25, 26 and 27, respectively). Moreover, the charge controlling means are all electrically connected by a common terminal (as shown connecting ring 54) which is insulated from shaft 38 by an insulating sleeve 19. The entire rotor structure 30 is rotatable mounted within stator 14. Stator 14 is circumferentially positioned around rotor 30 and radially spaced therefrom and is provided with stator plates 10, 11, 12 and 13 secured thereto around the iner surface of the stator.

An electrical schematic diagram of the assembled rotor 30 and stator 40 is shown in FIGURE 5. As indicated previously, supply lines 16, 15, 20 and 18 (from a four-phase alternating current source) are connected to stator plates 12, 11, 10 and 13, respectively. The rotor plates are electrically connected by means such as resistors 42, 44, 46, 48, 50 and 52 to a common terminal 54. As shown resistors 42, 44, 46, 48, 50 and 52 are connected to rotor plates 22, 23, 24, 25, 26 and 27, respectively. The terminal 54 may be insulated or may be connected to a ground point of the electrical system. The resistors as shown are used as charge controlling devices or means and their operation will be described later. In general, (though, they perform the function of controlling the rate of change of the induced charges on the rotor plates. As used herein the term "charge controlling device or means" means any bilateral electrical energy absorbing element, or any unilateral electrical energy absorbing element used in combination with another such element to provide bilateral operation, capable of controlling the rate at which induced electrical charges move on or off the conducting surfaces. An example of such a bilateral electrical energy absorbing element is a resistor either of the linear or non-linear type. An example of a unilateral electrical energy absorbing element which when used in a pair (connected back to back in order to provide passage of the induced charges in both directions) can provide bilateral operation include vacuum tubes, transistors and the like. Thus, for example, a unilateral energy absorbing element such as a rectifier, when used alone, is not suitable for use as a charge controlling device in the present invention. Such means as vacuum tubes or transistors operating bilaterally can have their characteristics changed while the energy converter is in operation, that is, without disassembling or stopping the converter. In this manner, the operating characteristics of the electrostatic energy converter can be changed remotely and/or while in operation.

A further modification of the energy converter of the present invention can also be provided wherein the rotor plates are energized by a polyphase alternating current source and the stator plates are electrically connected to charge controlling means in order to control the movement of the induced charges thereon. For example, each rotor plate can be electrically connected to an appropriate phase of a polyphase alternating current through a suitable slip ring attached to the shaft and stationary brushes through which an electric current can pass to the slip ring. Each stator plate can be electrically connected to a charge controlling means (resistor) which in turn can be connected to a common treminal. The energy converter would then function in the same manner as that described herein to establish a net resultant torque between the rotor and stator to produce energy conversion.

In the embodiment of this construction (FIGURES 1–5) where the area of each rotor plate was approximately 10 square inches (2" wide x 5" long) and the area of each stator plate was approximately 15 square inches (3" wide x 5" long) the value of the resistors used as charge controlling means was approximate 88 megohms. Each rotor plate was separated from its adjacent rotor plates by approximately one-fourth of an inch. Each stator plate was separated from its adjacent stator plates by approximately one-fourth of an inch. The value of the voltage used depends, in general, on the insultation between the rotor plates and stator plates. For example, a vacuum would allow a higher voltage than air and this along with the light weight of the converter makes it advantageous for application in space. When a leakproof casing is used for the converter pressurized gas can be used as the medium between the rotor plates and stator plates which will enable higher voltages to be used.

The following are set forth as some of the features and advantages to be derived from using the electrostatic energy converter of the present invention:

(1) The converter is capable of providing a starting torque without commutating devices.

(2) The converter exhibits an adjustable or variable speed-torque characteristic.

(3) The converter is capable of operating at temperatures where the usual electromagnetic type would fail.

(4) The converter can be fabricated from a wide variety of materials not limited to those found in the usual motors and generators.

(5) The converter is adaptable for operation in varied environments including vacuum, pressurized gas and insulating fluid.

(6) The converter is adaptable for operation in the vacuum environment in space.

Figure 7:
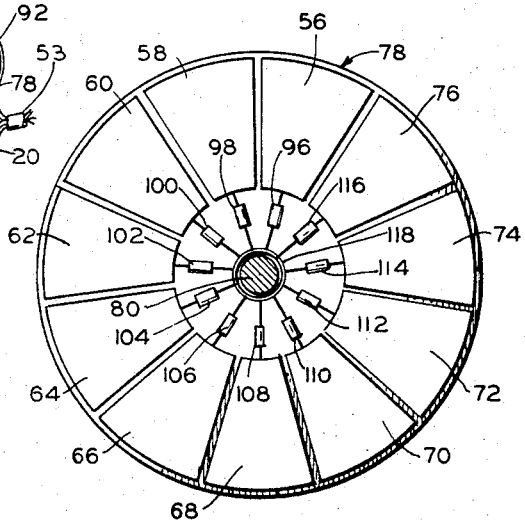
FIGURE 7 is a sectional side view of the apparatus viewed through the plane containing line 7—7 of FIGURE 6.

Another possible type of construction instead of the drum type just described is a disc construction. This is shown in FIGURES 6 through 9. In this embodiment the rotor conducting surfaces (rotor plates) 56, 58, 60, 62, 64, 66, 70, 72, 74 and 76 are secured to rotor disc 78 comprised of an insulating material as shown in FIGURE 7. The rotor plates radially project from the axis of rotation of the rotor to the periphery of the disc. The rotor plates can be positioned on both sides of the rotor disc 78 and a plurality of such discs used in the energy converter. As shown in FIGURE 6, five similar discs are arranged on and secured to shaft 80. Additionally each radial plate has electrically connected thereto a charge controlling means (resistors 96, 98, 100, 102, 104, 106, 108, 110, 112, 114 and 116 connected to rotor plates 56, 58, 60, 62, 64, 66, 68, 70, 72, 74 and 76, respectively). The charge controlling means are electrically connected to each other by connecting ring 118 in order to provide a common terminal.

Figure 8:
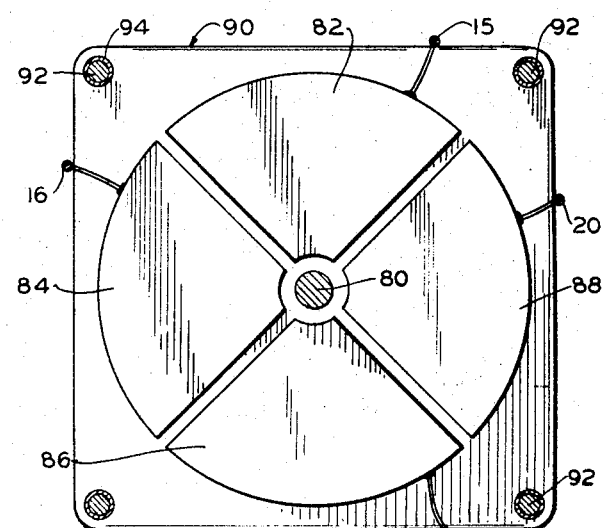
FIGURE 8 is a sectional side view of the apparatus viewed through the plane containing line 8—8 of FIGURE 6.
Figure 11:
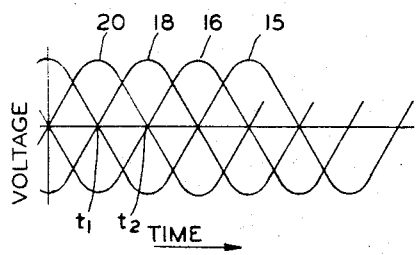
FIGURE 11 is a graph of the polyphase voltages used with the embodiment shown in FIGURES 1 through 5.

Stator conducting surfaces (stator plates 82, 84, 86 and 88 are provided on each stator 90 comprised of insulating material as shown in FIGURE 8. The stator plates can be positioned on both sides of the stator plate 90 and a plurality of such stators used in the energy converter. As shown in FIGURE 6, six similar stators are arranged and secured together by bolts 92 and spacers 94. Note that although the rotor 78 is disc shaped (circular flat plate), the stator can be in various shapes and as shown is a square shaped flat plate.

In FIGURE 6, the assembled rotor disc 78 and stator 90 are shown. In this embodiment the casing or housing structure can be similar to the previously described energy converter and is, therefore, not shown. A plurality of parallel rotor discs (five) are secured to shaft 80 which is rotatably mounted within the energy converter. A plurality of parallel stator 90 are suitably assembled as by bolts 92 and spacers 94 and are interleaved with the rotor discs 78 thus enabling a high density of usable material. All corresponding stator plates may be electrically connected in parallel from a common polyphase alternating current source 53 with each supply line (15, 16, 18 and 20) connected to a stator plate (82, 84, 86 and 88) on each stator. In this embodiment the rotor plates and stator plates are oppositely disposed and parallel to each other with a small space provided therebetween in order to prevent the stator plates from making physical contact with the rotor plates. Thus, the stator plates as well as the rotor plates are perpendicular to the axis of rotation of the rotor discs.

Figure 9:
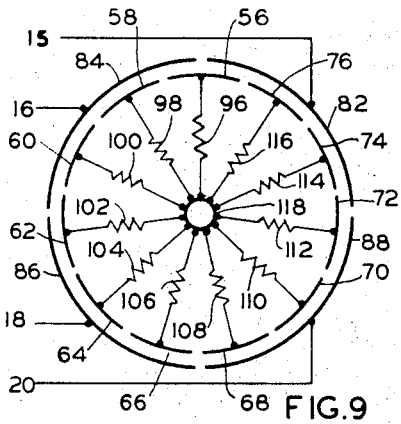
FIGURE 9 is a schematic diagram of the embodiment of FIGURES 6-8.

An electrical schematic diagram of an assembled rotor disc 78 and stator 90 is shown in FIGURE 9. Supply lines 16, 15, 20 and 18 (from a four-phase alternating current supply source) are connected to stator plates 84, 82, 88 and 86 respectively. The rotor plates 56, 58, 60, 62, 64, 66, 68, 70, 72, 74 and 76 are electrically connected to charge controlling means (resistors) 96, 98, 100, 102, 104, 106, 108, 110, 112, 114, 116, respectively, which are connected to a common terminal 118, as shown. As in the case of the previously described embodiment, other charge controlling means can be used instead of the resistors.

METHOD OF OPERATION

For the method of operation reference is made to FIGURES 1 through 5 and 11. With this embodiment an analyses at time $t_1$ is chosen when rotor plate 22 is opposite stator plate 10 as shown in FIGURE 4. Moreover, the analyses will be described at various speeds, that is, at zero speed, at speeds between zero and synchronous speed in the clockwise direction and at speeds greater than synchronous speed.

(a) *At zero speed.*— At an instant $t_1$ when stator plate 10 is supplied with a positive voltage, with respect to the equivalent neutral of the polyphase system, oppositely opposed rotor plate 22 will have a negative charge induced thereon. A quarter of an electrical cycle later at $t_2$ stator plate 10 will be at zero potential and stator plate 13 will be supplied with a positive potential as is apparent from FIGURE 11.

The resistor 42, electrically connected to rotor plate 22, will control the flow of the induced charges from plate 22 by resisting the movement of the induced charges and thus at time $t_2$ some negative charge will yet be present on plate 22. There will, therefore, be a force of attraction between the stator plate 13 and rotor plate 22 at time $t_2$ and a resulting clockwise net torque will be established.

At time $t_1$ when stator plate 12 is supplied with a negative voltage oppositely opposed rotor plate 25 will have a positive charge induced thereon. One quarter of an electrical cycle later (at time $t_2$) when stator plate 12 is supplied with zero potential, stator plate 11 will be supplied with a negative potential (see FIGURE 11) since it is connected to supply line 15 which is one-quarter phase behind supply line 16 in electrical sequence. The resisor 48 will control the change of induced charge of plate 25 by resisting the movement of the induced charge and thus at time $t_2$ some of the positive charge will yet be present on plate 25. There will, therefore, be a force of attraction between stator plate 11 and rotor plate 25 at time $t_2$ which will result in a clockwise net torque being established.

In like manner it can be shown that a force of repulsion exists between stator plate 11 and rotor plate 22 and between stator plate 13 and rotor strip 25 at time $t_2$ which contributes to clockwise torque.

In like manner it can be seen that the forces between the other stator plates and rotor plates will produce a clockwise net torque at time $t_2$.

The torque developed is clockwise because the alternating current source is in a clockwise sequential phase relationship, i.e., phase 20 leading phase 18. A reversal of the phase sequence will reverse the above described actions and reverse the torque direction.

(b) *At speeds between zero and synchronous speed in the clockwise direction.*—At any speed below synchronous speed motor torque is developed in approximately the same manner as that described for zero speed. Considering again rotor plate 22: At time $t_1$ it has a negative charge induced thereon while at time $t_2$ it will have rotated less than one-quarter of a revolution since the speed is less than synchronous speed. This essentially means that the attractive force between rotor plate 22 and stator plate 13 will yet produce a clockwise net torque or a torque in the same direction as the direction of rotation. Similar statements can be made for each of the other elements of the machine. It is found, therefore, that a net torque is produced at all speeds from zero to synchronous speed in the same direction as the direction of rotation.

The synchronous speed for the machine of the present invention, which determines whether the machine operates as a motor or generator, is defined by the following equation:

$$n = \frac{f \cdot a}{c}$$

where $n$ = synchronous speed in revolutions per second
$f$ = frequency
$a$ = number of phases
$c$ = number of stator plates (c) *At speeds greater than synchronous speed.*— At a speed above synchronous speed motor plate 22 will have moved more than one-quarter of a revolution during one-quarter of an electrical cycle, that is, from time $t_1$ to $t_2$. This essentially means that during the one-quarter electrical cycle from the time at which rotor plate 22 is opposite stator plate 10, the rotor plate 22 has moved some amount clockwise beyond stator plate 13. The previously mentioned attractive force occurring between stator plate 13 and rotor plate 22 when plate 13 is at a positive potential now means that a resultant net torque is developed which is counterclockwise or opposite to the direction of rotation. Thus, in order to maintain rotation of the rotor at a speed above synchronous speed mechanical energy must be supplied to the machine. In order to balance the electrical and mechanical energy inputs to the machine, there must be electrical energy output from the machine. The machine is, therefore, operating as an electrical generator whenever the speed is above synchronous speed.

Stated somewhat differently, the method of operation of the energy converter of the present invention can be described as being essentially based on three features which enable its operation as, for example, a motor. The first is a polyphase alternating current which is fed to the stator plates thus establishing a rotating electrostatic field on the stator plates and thus around the rotor plates. This rotating field induces electrical charges on the rotor plates which in turn sets up a rotation of induced electrical charges on the rotor plates. The second feature is the charge controlling means which function to control the movement of the induced electrical charge on the rotor plates by resisting the flow of such from the rotor plates thus tending to keep the induced electrical charges on the rotor plates for a time sufficient to cause the rotation of the induced electrical charges around the rotor plates, in effect, to lag behind the rotating electrostatic field on the stator plates. The third feature is that, as previously shown, when the rotor is rotating at speeds below synchronous speeds the forces, at any instant in time, between charges on oppositely opposed rotor plates and stator plates, since such are not equal and opposite, establish a resultant net torque which converts electrical energy input to mechanical energy output.

In like manner, when the electrostatic energy converter is operated at speeds above synchronous speeds, as previously shown, and when considered with the foregoing first and second features, the forces, at any instant in time, between charges on oppositely opposed rotor plates and stator plates, since such are not equal and opposite, establish a resultant net torque which converts mechanical energy input into electrical energy output.

MODIFICATION OF OPERATION

Speed vs. torque curve

The quantitative values of the torque versus speed characteristic depend to a large extent upon the characteristics of the charge controlling means. The shape of the speed-torque characteristic can be varied by changing the operational parameter of the charge controlling means, such as, in the case of resistors used as the charge controlling means, by changing their resistance value. The value of starting torque and the speed at which maximum torque occurs can be changed, if desired, in this manner.

Type of electrical system

Figure 10:
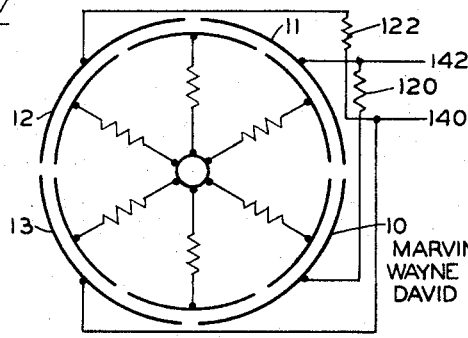
FIGURE 10 is a modification of the embodiment shown in FIGURES 1 through 5 suitable for single phase operation.

This electrostatic machine is basically adapted to operate in conjunction with a polyphase electrical system. In some cases it may be desirable to operate the device in conjunction with a single-phase system. It is possible to operate the four-phase machine depicted in FIGURE 1–5 from a single-phase system having supply lines 140 and 142 as shown schematically in FIGURE 10. This requires the use of two resistors 120 and 122 as phase shifting devices. It is not possible to accomplish the desired result with only one resistor. The resistors should have values which sequentially cause simulated four-phase operation of the stator plates. Other phase shifting elements well known in the art may be used instead of resistors 120 and 122.

What is claimed is:
1. An electrostatic energy converting device useful as a motor or generator comprising a rotor member and a stator member, each provided with a plurality of conducting surfaces, the conducting surfaces of one of said members adapted to be energized by a polyphase alternating current source in order to induce electrical charges on the conducting surfaces of said other member, and charge controlling means, electrically cooperating with each of said conducting surfaces of said other member, for controlling the movement of said induced electrical charges and establishing a resultant net torque between said rotor and said stator to produce energy conversion.

2. An electrostatic energy converting device according to claim 1, wherein said conducting surfaces of said stator are adapted to be energized by a polyphase alternating current source.

3. An electrostatic generator according to claim 2, wherein said charge controlling means electrically cooperate with each of said conducting surfaces of said rotor to resist the movement of said induced electrical charges and establish a resultant net torque between said rotor and said stator by rotation of said rotor above synchronous speed.

4. An electrostatic generator according to claim 3, wherein said conducting surfaces of said rotor are oppositely disposed to said conducting surfaces of said stator.

5. An electrostatic generator according to claim 4, wherein said rotor is a drum having rotatable driving means connected thereto and rotatable about an axis of rotation, said conducting surfaces of said rotor positioned on the periphery thereof and parallel to said axis of rotation, and said conductor surfaces of said stator positioned around said rotor and parallel to said axis of rotation.

6. An electrostatic generator according to claim 5, wherein said charge controlling means are a plurality of resistor elements.

7. An electrostatic generator according to claim 4, wherein said rotor is a disc having rotatable driving means connected thereto and rotatable about an axis of rotation, said conducting surfaces on said rotor radially projecting from said axis of rotation to the periphery of said disc and said conducting surfaces of said stator positioned around said axis of rotation and parallel to said conducting surfaces of said rotor.

8. An electrostatic generator according to claim 7, wherein said charge controlling means are a plurality of resistor elements.

9. An electrostatic motor according to claim 2, wherein said charge controlling means electrically cooperate with each of said conducting surfaces of said rotor to resist the movement of said induced electrical charges and establish a resultant net torque between said rotor and said stator by rotation of said rotor below synchronous speed.

10. An electrostatic motor according to claim 9, wherein said conducting surfaces of said rotor are oppositely disposed to said conducting surfaces of said stator.

11. An electrostatic motor according to claim 10, wherein said rotor is a drum having rotatable means for driving connected thereto and rotatable about an axis of rotation, said conducting surfaces of said rotor positioned on the periphery thereof and parallel to said axis of rotation, and said conducting surfaces of said stator positioned around said rotor and parallel to said axis of rotation.

12. An electrostatic motor according to claim 11, wherein said charge controlling means are a plurality of resistor elements.

13. An electrostatic motor according to claim 10, wherein said rotor is a disc having rotatable means for driving connected thereto and rotatable about an axis of rotation, said conducting surfaces of said rotor radially projecting from said axis of rotation to the periphery of said disc and said conducting surfaces of said stator positioned around said axis of rotation and parallel to said conducting surfaces of said rotor.

14. An electrostatic motor according to claim 13, wherein said charge controlling means are a plurality of resistor elements.

References Cited

UNITED STATES PATENTS

| | | | |
|---|---|---|---|
| 735,621 | 8/1903 | Thomson | 310—5 |
| 1,861,166 | 5/1932 | Sieber | 310—5 XR |
| 2,232,143 | 2/1941 | Schweitzer | 310—5 |
| 2,522,106 | 9/1950 | Felici | 310—6 |

MILTON O. HIRSHFIELD, *Primary Examiner.*

D. F. DUGGAN, *Assistant Examiner.*